US011500982B2

(12) United States Patent
Lotspeich (10) Patent No.: US 11,500,982 B2
(45) Date of Patent: Nov. 15, 2022

(54) SYSTEMS AND METHODS FOR RELIABLY INJECTING CONTROL FLOW INTEGRITY INTO BINARIES BY TOKENIZING RETURN ADDRESSES (71) Applicant: RUNSAFE SECURITY, INC., McLean, VA (US)

(72) Inventor: Erik Raymond Lotspeich, Huntsville, AL (US)

(73) Assignee: RUNSAFE SECURITY, INC., McLean, VA (US)

( * ) Notice: Subject to any disclaimer, the term of this patent is extended or adjusted under 35 U.S.C. 154(b) by 110 days.

(21) Appl. No.: 17/268,582

(22) PCT Filed: Aug. 15, 2019

(86) PCT No.: PCT/US2019/046629
§ 371 (c)(1),
(2) Date: Feb. 15, 2021

(87) PCT Pub. No.: WO2020/037111
PCT Pub. Date: Feb. 20, 2020

(65) Prior Publication Data
US 2021/0200862 A1 Jul. 1, 2021

Related U.S. Application Data (60) Provisional application No. 62/764,751, filed on Aug. 15, 2018.

(51) Int. Cl.
G06F 21/54 (2013.01)
G06F 11/07 (2006.01)
G06F 11/14 (2006.01)
(52) U.S. Cl.
CPC .......... *G06F 21/54* (2013.01); *G06F 11/0706* (2013.01); *G06F 11/0751* (2013.01); *G06F 11/1438* (2013.01)

(58) Field of Classification Search
CPC .. G06F 21/54; G06F 11/0706; G06F 11/0751; G06F 11/1438
See application file for complete search history.

(56) References Cited

U.S. PATENT DOCUMENTS

2008/0258864 A1* 10/2008 Hattori .................... H04B 5/02
340/5.8
2011/0185433 A1 7/2011 Amarasinghe et al.
(Continued)

OTHER PUBLICATIONS

Prasad et al., "A Binary Rewriting Defense agiainst Stack based Buffer Overflow attacks" :https://www.usenix.org/legacy/event/usenix03/tech/full_paper/full_papers/prasad/prasad.pdf.

*Primary Examiner* — Quazi Farooqui
(74) *Attorney, Agent, or Firm* — Perkins Coie LLP (57) ABSTRACT Systems and methods of modifying a program binary by injecting code into a function of a program binary that tokenizes the return address of the function. The tokenization of the return address improves the robustness of the program binary against cyberattacks. For example, an attacker's attempt to hijack program flow before a function return will fail since any return address modified by the adversary will be tokenized (e.g., using a binary operation such as an XOR) resulting in an unusable address that will cause the system to crash. One advantage of the improved CFI consumes less average overhead and does not require all of the complications of the conventional CFI systems. In some embodiments, the tokenization includes applying a binary operation on a randomly-generated token and the return address. The token can be generated at transform time, load time, or run time.

20 Claims, 9 Drawing Sheets (56) References Cited

U.S. PATENT DOCUMENTS

| | | |
|---|---|---|
| 2011/0258704 A1 | 10/2011 | Ichnowski |
| 2013/0019105 A1* | 1/2013 | Hussain .................. G06F 21/31 |
| | | 713/189 |
| 2013/0290936 A1* | 10/2013 | Rhee .................. G06F 11/3604 |
| | | 717/128 |
| 2016/0021121 A1 | 1/2016 | Cui et al. |
| 2017/0329621 A1 | 11/2017 | Beckett |

* cited by examiner

| Without tokenizing return address | With tokenizing return address |
|---|---|
| push rbp<br>mov rbp, rsp | mov [rsp-0x8], rax   # Save rax<br>mov rax, token<br>xor rax, [rsp]     # Encode: return addr ⊕ token<br>mov [rsp], rax     # Save return addr data<br>mov rax, [rsp-0x8]  # Restore rax<br>push rbp<br>mov rbp, rsp |

*FIG. 6A*

| Without tokenizing return address | With tokenizing return address |
|---|---|
| leave<br>ret | leave<br><br>mov [rsp-0x8], rax   # Save rax<br>mov rax, token     # Return addr copy<br>xor rax, [rsp]     # Recover: return addr ⊕ token<br>mov [rsp], rax     # Restore return addr<br>mov rax, [rsp-0x8]  # Restore rax<br><br>ret |

SYSTEMS AND METHODS FOR RELIABLY INJECTING CONTROL FLOW INTEGRITY INTO BINARIES BY TOKENIZING RETURN ADDRESSES

CROSS-REFERENCE TO RELATED APPLICATIONS

This is a U.S. National Stage of PCT/US2019/046629 filed Aug. 15, 2019, which claims priority to U.S. Provisional Application No. 62/764,751 filed Aug. 15, 2018, both of which are incorporated herein by reference in their entireties.

TECHNICAL FIELD

This disclosure is related to improved cybersecurity solutions. More particularly, embodiments disclosed herein are directed modifying a program binary by injecting code into a function of a program binary that tokenizes the return address of the function.

BACKGROUND

The ubiquitous use of electronic devices has led to an increased concern for security. In an age where software controls a significant portion of our daily lives, this concern is valid now more than ever. While there have been several attempts at building better tools and developing better processes to avoid introducing bugs in software that lead to vulnerabilities, attackers are coming up with newer ways to exploit vulnerabilities in software. One of the most prominent attack methods are stack-based attacks, which is a type of a return-oriented programming (ROP) attack. Stack-based attacks exploit vulnerabilities in software to hijack control flow by deviating from the intended control flow of the program and often times executing arbitrary code directed by the attacker to perform malicious computation.

One of the methods used to protect against the hijacking of computer software is the use of the enforcement of Control Flow Integrity ("CFI"). CFI is a binary transformation method that protects indirect control transfers in the form of calls, returns and indirect jumps, and by tagging control transfers and valid destinations with identifier strings or otherwise identification labels. A control transfer can only jump to an address if the tag at the destination matches the tag at the control transfer. Each control transfer may have many potential targets, which will all have identical tags. Any transfers that target the same address also will have identical tags.

However, conventional CFI methods necessitate that the structure of the identification labels requires a rigorous implementation process that generally renders widespread or commercial application unfeasible. For example, a unique identifier is attached to each call-destination and return-destination pairing. Further, valid indirect call flow transfer targets from a call or return instruction are restricted to a single destination specifically paired to that origin. Consequently, conventional CFI systems are complicated and require significant overhead. Thus, there is an increased need for improved CFI systems and methods for mitigating stack-based attacks.

DETAILED DESCRIPTION

This disclosure is directed at systems and methods of defending against stack-based cybersecurity attacks that exploit vulnerabilities in ROP based attacks. One way of handling vulnerabilities can be to make changes to the source code. In many scenarios, making changes to the source code may not be feasible. For example, a programmer might not have the source code at all, or does not have permission to make fixes to the source code. The present technology is directed at such scenarios. That is, one advantage of the disclosed technology is that vulnerabilities in program binaries can be handled even in scenarios where the source code is unavailable or making changes to the source code is not possible. Embodiments disclosed herein are directed at making transforms or changes to a program binary without modifying the source code. Examples of a binary can be firmware, a program for running a web server, document viewer, a web browser, a mobile application, or any other program binary. The transformation of an original program binary (e.g., provided by manufacturers and suppliers) associated with an electronic system into a transformed binary (e.g., in accordance with methods disclosed herein) can be done before or after the electronic system is deployed for usage and does not require access to source code or an operating system. Furthermore, a transformed binary does not negatively impact or otherwise alter or the typical behavior of the electronic system. If one or more changes to a program binary are made to a program binary, the resulting binary is called a transformed binary, and the changes are said to have been made at "transform time."

The system and methods of the present disclosure can be applied across many different operating systems (e.g., Linux, UNIX, Windows) and in devices with no traditional operating system. For purposes of the discussions herein, the term "system" generally refers to any computing system including but not limited to smartphones, routers, wearable consumer devices, tablets, web servers, email servers, laptops, desktops, switches, or generally any processor-controlled electronic device.

Conventional CFI enforcement is carried out through the use of a Control Flow Graph ("CFG"). The CFG dictates the software execution path. Conventionally, the CFG can be defined or otherwise generated by analysis, such as, source-code analysis, binary analysis, or execution profiling.

The embodiments of the improved (e.g., more reliable) CFI disclosed herein are directed to modifying a program binary by injecting code into a function of a program binary that tokenizes the return address of the function. The tokenization of the return address improves the robustness of the program binary against cyberattacks and results in an improved CFI. Yet, the improved CFI consumes less average overhead and does not require the complications of the conventional CFI systems. Also, the improved CFI system and method does not require the generation of a CFG. In some embodiments, the tokenization includes applying a binary operation on a randomly-generated token and the return address. In some embodiments, the token can be randomly generated at transform time. In some embodiments, the token can be randomly generated at load time, i.e., when the program binary is loaded into the memory. In some embodiments, the token can be randomly generated at run time, e.g., at the point of entry into a function. Various embodiments, advantages, and aspects of the disclosed technology will be apparent in the following discussions.

Figure 1:
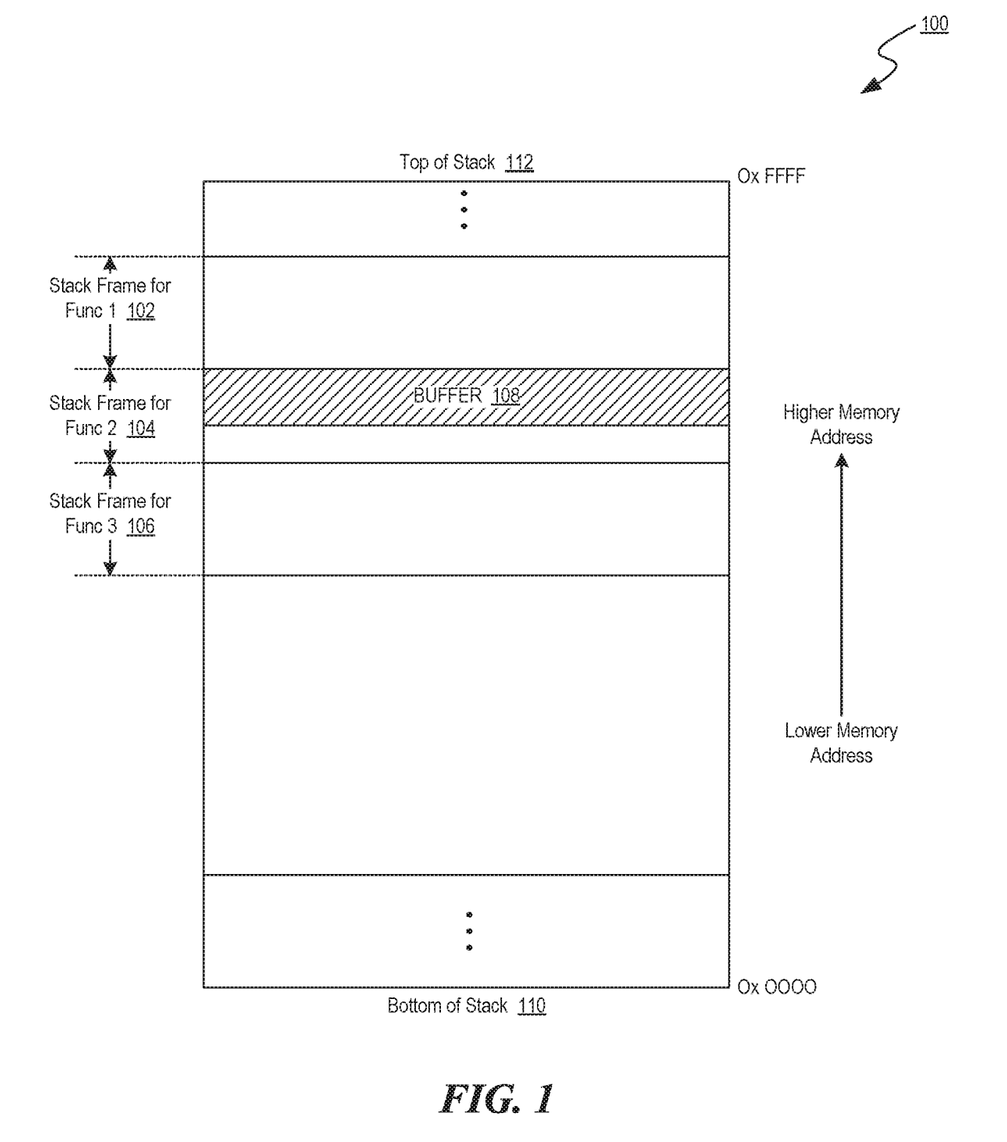
FIG. 1 shows a diagrammatic representation of a stack in computer memory.
Figure 2:
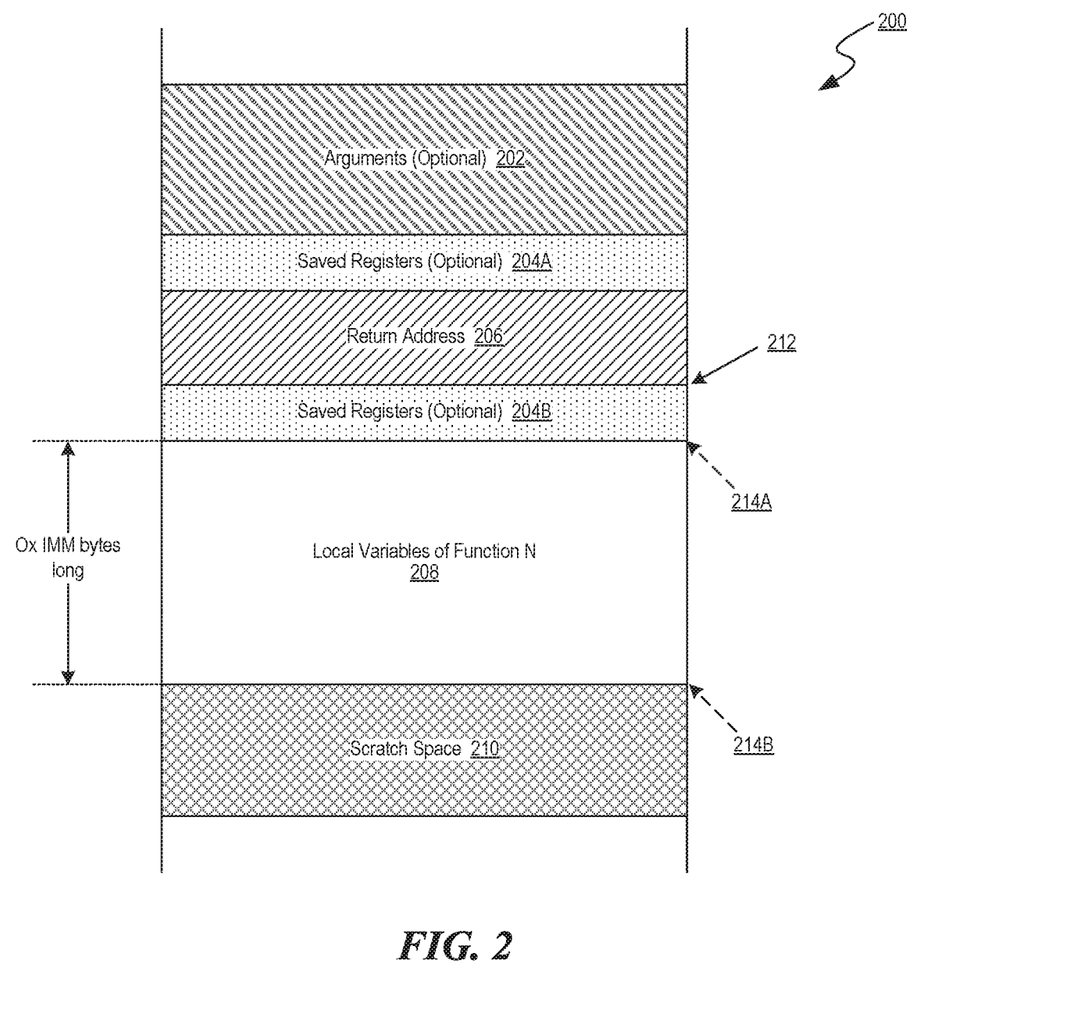
FIG. 2 shows a diagrammatic representation of a typical stack frame.

Referring now to the drawings, FIG. 1 shows a diagrammatic representation of a stack 100 in computer memory (alternately known as Random Access Memory or RAM). Stack 100 includes a top 112 and a bottom 110. When the program requires more memory, data/information is pushed at the bottom of the stack. Hence, as new data/information comes in, the newer data is "pushed below" the older ones. For example, stack 100 includes lower memory addresses (starting from 0x 0000) at the bottom 110, and higher memory addresses (ending at 0x FFFF) at the top 112. Stack 100 includes stack frames for three example functions, denoted Func 1, Func 2, and Func 3. The hypothetical example in FIG. 2 illustrates a scenario where Func 1 calls Func 2 and Func 2 calls Func 3. Local variables of Func 1, Func 2, and Func 3 are stored in their respective stack frames. In FIG. 1, the stack frames for Func 1, Func 2, Func 3 are denoted 102, 104, and 106 respectively.

On many systems, the memory layout of a program, or the system as a whole, is well defined. By sending in data designed to cause a buffer overflow, it is possible to write into areas known to hold executable code and replace it with malicious code, or to selectively overwrite data pertaining to the program's state, therefore causing behavior that was not intended by the original programmer. Buffers are widespread in operating system (OS) code, so it is possible to make attacks that perform privilege escalation and gain unlimited access to the computer's resources. FIG. 1 shows buffer 108 included within stack frame 104. Buffer overflows are one of the most common exploits in software that result from buggy code which fails to perform the appropriate bounds checking. A buffer overflow is an anomaly where a program, while writing data to a buffer (e.g., buffer 108), overruns the buffer's boundary and overwrites adjacent memory locations. For example, in FIG. 1, a buffer overflow can cause the program to overwrite a portion of stack 104.

In a hypothetical example of buffer overflow, a hypothetical bug identified as Bug A can cause a buffer overflow in a hypothetical program called Program B. During its operation, let us suppose that program B allocates a fixed-size piece of memory to hold a font name and then copies the font name from a file into this piece of memory. Program B does not, however, check to ensure whether the font name will entirely fit in this piece of memory. In an event when Program B is provided with a really long font name, Program B overflows the buffer, corrupting its own memory, and an attacker can use this to execute arbitrary malicious code.

Attackers can exploit buffer overflows to manipulate the normal flow of the program to their advantage in several ways. In one instance, an attacker can overwrite a local variable that is located near the overflowing buffer on the stack, in order to change the behavior of the program. In another instance, an attacker can overwrite the return address in a stack frame. As a result, when the function returns, execution will resume at the return address as specified by the attacker. The return address can be a buffer associated with a user input which can be manipulated by the attacker for malicious intent. In yet another instance, an attacker can overwrite a function pointer or an exception handler, which is subsequently executed. Under ideal circumstances, incorporation of bounds checking can prevent buffer overflows, but it consumes additional storage (e.g., extra lines of code) and requires additional computation time. As a result, bounds checking may not be applicable in many scenarios or use cases. An advantage of the disclosed technology is that does not require bounds checking and is thus well suited for such scenarios.

It will be understood that the stack in FIG. 1 is for illustrative purposes only. Embodiments of the present technology impose no restrictions on the lengths, the data/information stored in the stack, and/or the number of stack frames that can be allocated on the stack.

FIG. 2 shows a diagrammatic representation of a typical stack frame 200. Stack frame 200 includes memory allocated for: arguments 202; saved registers 204A, 204B; return address 206; local variables of an arbitrary Function N 208; and scratch space 210. The length of the stack frame is the amount (e.g., in number of bytes) of memory allocated to the local variables of Function N. This is denoted as the length 208 in FIG. 2.

Registers are data storage locations directly on the CPU. With some exceptions, the size, or width, of a CPU's registers define its architecture. For example, in a 64-bit CPU, registers are 64 bits wide. The same is true of 32-bit CPUs (32-bit registers), 16-bit CPUs, and so on. Registers are very fast to access and are often the operands for arithmetic and logic operations. In FIG. 2, data stored in registers can be saved optionally on the stack in regions 204A, 204B of the memory. A typical stack is an area of computer memory with a fixed origin and a variable size. Initially the size of the stack is zero. In FIG. 2, the length of the stack frame is denoted as 0xIMM bytes long.

A prologue or preamble of a function includes instructions (e.g., a few lines of code at the beginning of the function) for setting up a stack frame, i.e., for making space on the stack for local variables of the function. Thus, a function prologue typically performs the following actions: pushes the current base pointer onto the stack so it can be restored later; assigns the value of stack pointer (which is pointed to the saved base pointer) to the base pointer so that a new stack frame can be created on top of the old stack frame; and moves the stack pointer further by decreasing (or increasing) its value as the stack grows down (or up).

In the INTEL x86 processors, special registers are used to store the value of the stack pointer and frame pointer. For example, special registers rbp and rsp are used wherein rbp is the base pointer (also known as frame pointer), which points to the bottom of the current stack frame, and rsp is the stack pointer, which points to the top of the current stack frame. rbp has a higher value than rsp because the stack starts at a high memory address and grows downwards. On the INTEL x86 processors, a function prologue can include the sub rsp, 0xIMM instruction, where IMM denote how many bytes of space to allocate on the stack for storing local variables of a function. Thus, a hypothetical instruction sub rsp, 0x9 allocates 9 bytes of memory on the stack.

The stack pointer, usually in the form of a hardware register, points to the most recently referenced location on the stack. When the stack has a size of zero, the stack pointer points to the origin of the stack. In FIG. 2, the location of the stack pointer is denoted 214A at the start of the prologue and at location 214B at the end of the prologue. FIG. 2 also shows a frame pointer pointing to location 212 in the memory. At function return, the stack pointer is restored to the frame pointer, i.e., the value of the stack pointer just before the function was called.

A function epilogue appears at the end of the function, and restores the stack and registers to the state they were at, before the function was called. In essence, the epilogue reverses the actions of the function prologue and returns control to the calling function. An epilogue typically does the following actions: drop the stack pointer to the current base pointer so room reserved in the prologue for local variables is freed; pops the base pointer off the stack so it is restored to its value before the prologue; and returns to the calling function by popping the previous frame's program counter off the stack and jumping to it.

In the absence of CFI, even without code injection, an attacker can cause arbitrary behavior and computation of the program. To understand the implementation of the improved CFI disclosed herein, it is first necessary to understand binary load process for a typical operating system, such as, for example the Microsoft's Windows operating system. Although, the binary load process is being described with respect to the Windows operating system, it would be understood by a person of order a skilled the art that this would apply to other operating systems as well.

Figure 3:
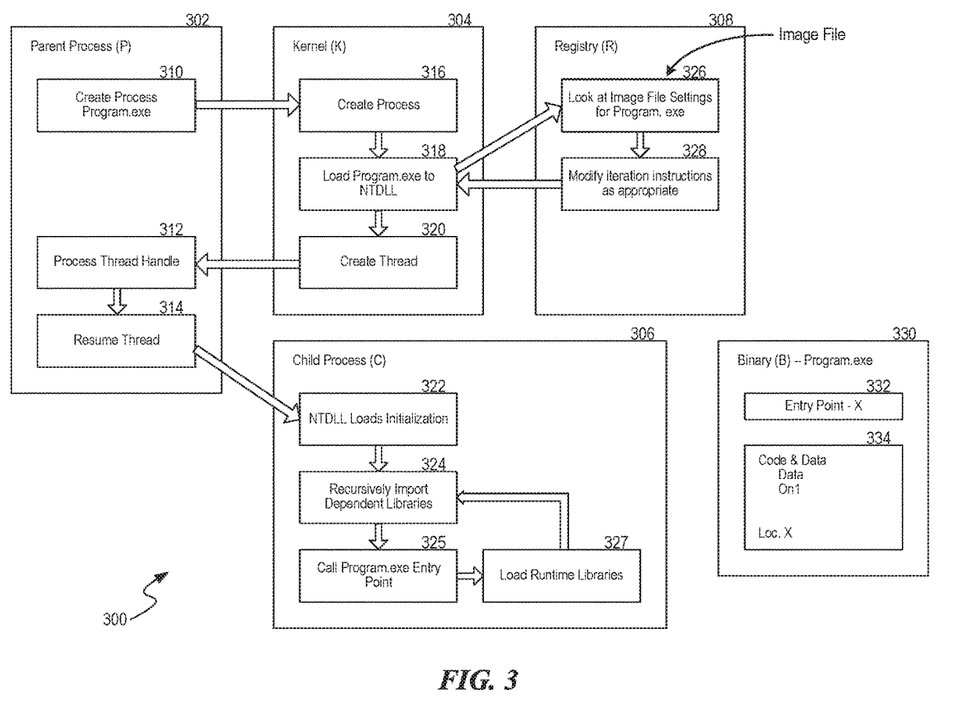
FIG. 3 shows a representative conventional binary load process for an operating system.

FIG. 3, generally at 300, shows a representative diagram for a normal binary load process. This process includes four components for establishing the running of a new program, e.g., in the Windows operating system. These components include parent process 302, kernel 304, child process 306, and registry 308. Parent process 302, which creates one or more child processes, requests the operating system to load a target program. The target program may be loaded from the command line, "cmd.exe." The target program also may be loaded from a graphical user interface ("GUI"), "explorer.exe."

Kernel 304 is the core of the operating system. The kernel manages all the hardware, I/O, displays, storage, and other systems of a computer. For purposes of the present technology, kernel 304 has the responsibility for allocating resources, e.g., memory, requested by the parent process and initializing the operating environment for each child process.

Child process 306, which is created by parent process 302, is a target program that is to be loaded and run. For purposes of the present technology, the child process 306 and/or the parent process 302 can be protected by the improved CFI system and method of the present technology. With respect to the description of the present technology, a program run by the child process will be referred to as "Program.exe." Further, the term "Program.exe" for purposes of describing the present technology is meant to refer to any binary, e.g., *.exe, *.com, and *.dll.

Preferably, registry 308 is a registry that has a file-based data-structure. The registry includes settings for the operating system and applications. For binaries on a computer, the registry includes settings that control the start-up instructions for any given binary.

Again referring to FIG. 3, the normal process for loading a binary, which in this case is a child program (Program.exe), on a computer will be described. The normal process being referred to is provided is only for the purposes of showing a system upon which the improved CFI system of the present technology may be layered. After there is an understanding of the normal binary loading process, the improved CFI system and method of the present technology that is layered on the normal binary loading process will be described.

Referring to FIG. 3 at 310, the current parent process (parent program) 302 packages a request to send to kernel 304 to launch child process (target program), Program.exe. At process step 316 of kernel 304, the kernel receives the request to create Program.exe. The kernel will perform implementation specific steps to verify that the request is allowed and the appropriate resources exist to create Program.exe. If the request is permitted, the kernel moves the request to process step 318. If the request not permitted, the request is denied and the process terminates.

Process step 318 queries appropriate information about the settings for Program.exe from registry 308. At process step 326 of registry 308, the image file settings of Program.exe are looked up based on the process name, in this case Program.exe. If the settings specify an alternative program to load, then the kernel load instructions are modified at process step 228. If the review reveals that there is no need for any modification to kernel load instructions, then information as to this condition is queued at process step 228 for transmission to process step 318 of kernel 304.

When the registry transmits instructions from process step 328 of registry 308 to process step 318 of kernel 304 and there is a need to modify the kernel instructions, the kernel load process will be adjusted accordingly. These registry instructions may include for example start-up flags or load a debugger. If, on the other hand, the transmission from process step 328 of registry 308 to process step 318 of kernel 304 includes no modification instructions, the kernel loading process will continue without modification.

Again referring to process step 318 of kernel 304, after the instructions have been received from process step 328 of registry 308 and implemented, the kernel copies Program.exe, Native code/data, and NTDLL from on disk locations into running memory. For purposes of describing the present technology, NTDLL includes a number of user-mode functions, such as call stubs and the runtime library code, collectively known as "Native API."

After processing at process step 318 of kernel 304 is completed, the process moves to process step 320 where a thread is created for the new process. With respect to the thread created at process step 320, it means the kernel resource, which corresponds to the execution state of the child process 306, will start executing at process step 322. The identifier of the process and the thread that is created is transmitted to step 312 of parent process 302 where these are stored in memory by the parent process. The process continues to process step 314 of parent process 302 where the thread from process step 320 is resumed, which means the kernel will schedule the thread to execute at some point in the future.

Process step 322 of the child process 306 begins once the kernel schedules the thread to execute, which cannot happen until the thread has been resumed at process step 314. At process step 322, there is NTDLL loader initialization. At this step, the child process specific initialization functions inside the NTDLL are executed and there is initialization of the data structures. For example, the functions that may be executed include the dynamic loader initializer and the data structures that may be initialized include the thread information block. Further, the process for loading dependent libraries begins.

Once the process activities at process step 322 are completed, the child process moves to process step 324 where dependent libraries are recursively imported to the child process. These libraries are received from the import tables stored in Program.exe and every loaded library. Following the import of dependent libraries, the child process is transmitted to process step 325. At process step 25, the Program.exe entry point is called. The entry point is a location that represents the beginning of the code for execution. In the Windows context, the file to be called would be in the PE file. The child process will begin to serially execute the instructions located at the entry point.

The binary to be executed is shown at 330 of FIG. 3. The entry point for the binary Program.exe is shown at 332. The native code and data for Program.exe are shown at 334 and it is located at "Loc. X" in an appropriate memory.

As shown at process step 325, there is a connection between it and load runtime libraries process step 327. At times during execution of the child program, additional libraries are referenced and loaded. This may be occur for several reasons, such as delayed imports or calls to functions, such as LoadLibrary. When that is the case, execution is paused at some "Instruction I" so the new library can be loaded from process step 327 to process step 325. The loading process is the same as before, and any dependent libraries are recursively loaded. Then, execution is transferred to the appropriate point in the library that has just been loaded, and when finished returns back to instruction I.

Figure 4A:
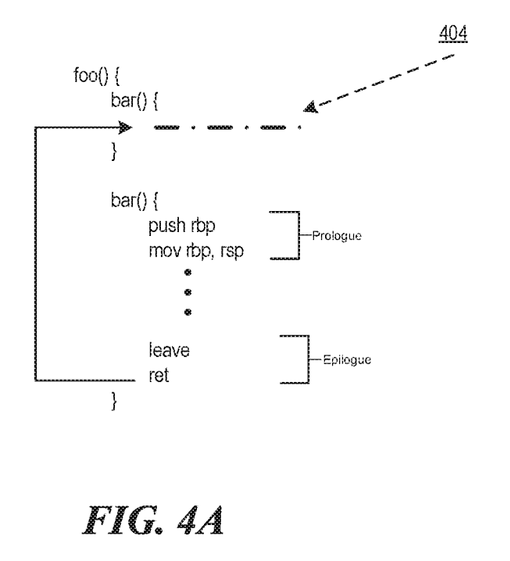
FIG. 4A shows a sample assembly code without tokenization of return address.

FIG. 4A shows a sample assembly code without tokenization of return address. For example, FIG. 4A shows a first function foo ( ) calling a second function bar ( ). Reference numeral 404 denotes the instruction after the program flow returns to foo ( ) from bar ( ). The return address (e.g., return address 206 in FIG. 2) for this instruction is stored on the stack. During normal execution, the control flow retrieves this address from the stack and returns to foo ( ). FIG. 4A also shows a representative prologue and epilogue of the function bar ( ). An attacker that wants to take control of program flow can leverage vulnerable code to overwrite the return address on the stack, pointing to malicious code they have previously loaded, or to ROP gadgets in a ROP attack. Under such attacks, control flow would not return to instruction 404.

Figure 4B:
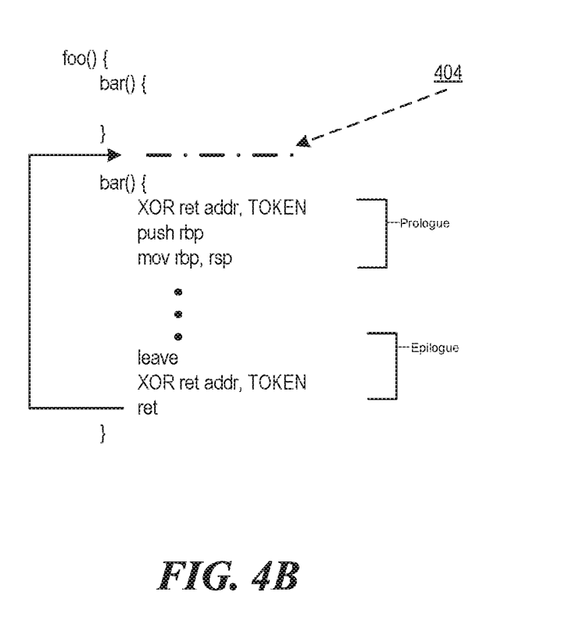
FIG. 4B shows a sample assembly code with tokenization of return address, according to some embodiments of the disclosed technology.

FIG. 4B shows a sample assembly code with tokenization of return address, according to some embodiments of the disclosed technology. FIG. 4B shows that the return addressed encoded at function entry (prologue) and decoded at function exit (epilogue), based on applying a binary operation to the return address and a token. Because of the encoding (tokenization of the return address in the prologue) and the decoding (tokenization of the return address in the epilogue), under normal program flow, the effect of the token does not impact program flow. Thus, in one example, the binary operation XOR is applied on the token and the return address. If an attacker attempts to hijack the program flow between the prologue and the epilogue by manipulating the return address, the program flow would end up in an arbitrary location instead of the actual return address because of the tokenization of the return address in the epilogue. In some embodiments, a token may be selected such that manipulation of the token can cause the program binary to crash.

Figure 4C:
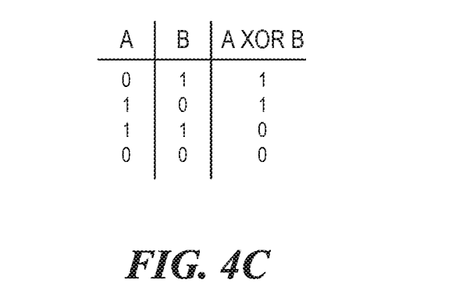
FIG. 4C illustrates a binary operation used in tokenization.

FIG. 4C illustrates a binary operation used in tokenization. The binary operation in FIG. 4C is the XOR operation. As an illustrative example, if A and B are two binary variables, the outcome A XOR B (alternatively denoted as A ⊕B) is 1 only if A and B have different values. It will be understood that the XOR operation used in tokenization of the return address is for illustration only. In alternate embodiments, other appropriate binary operations of the token and the return address can be employed.

Figure 5:
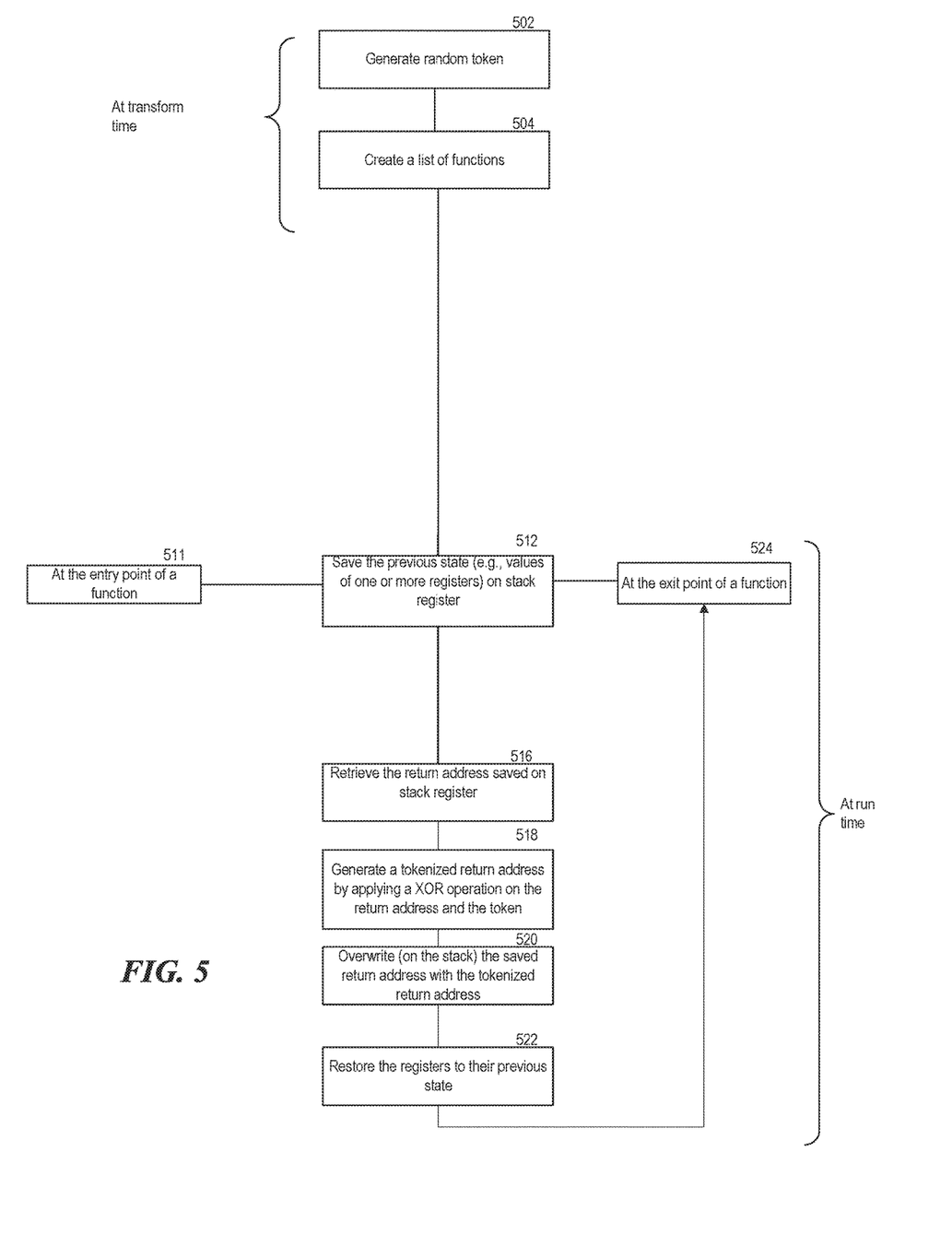
FIG. 5 shows a flowchart of steps of a process associated with generating a token at transform time, according to some embodiments of the disclosed technology.

FIG. 5 shows a flowchart of steps of a process associated with generating a token at transform time, according to some embodiments of the disclosed technology. The transform time is a lifecycle phase of a program binary that occurs after compilation but before the program binary is loaded into memory. Steps 502 and 504 occur at transform time. Steps 512, 516, 518, 520, 522, and 524 occur at run time. At step 502, the process generates a token. For example, given one instance of a program binary, all the functions in the program binary are subjected to the same token. At step 504, the process creates a list of functions that are to be modified (e.g., whose prologues and epilogues are to be modified. Creating a list of functions that are to be modified includes identifying that a snippet of assembly code in the program binary corresponds to a function. For example, a function can be identified by the presence of debug symbols in one or more sections of the program binary. As another example, a function can be identified according to the information in the file headers. As yet another example, a function can be identified according to the heuristics of the code and data section. Another method for identifying functions is to search for sequences of bytes that indicate function prologues. Identification of code resembling function-like characteristics can be done using an automated tool (e.g., Binary Ninja, IDA Pro, or Immunity Debugger) and/or manually by a programmer. In some instances, certain functions, such as imported functions, functions that do not have a matching prologue-epilogue pair, and other unsuitable functions are not included in the list. At step 511, the program flow enters the entry point (e.g., the prologue) of the function. At step 512, the process saves the previous states of one or more registers on the stack register. At step 516, the process retrieves the return address of the function saved on the stack register. At step 518, the process generates a tokenized return address by applying a binary operation (e.g., an XOR operation of the return address and the token) on the return address and the token. The process overwrites (step 520) the saved return address with the tokenized return address and restores (step 522) the registers to their previous state. Steps 512, 516, 518, 520, and 522 are performed at the entry point (prologue 511) and the exit point (epilogue 524) of the function. At the exit point (epilogue 524) of the function, steps 512, 516, 518, 520, and 522 are repeated. It will be understood that under normal program operation (no anomalous behavior), the result of applying two tokenizations (once at the prologue and subsequently at the epilogue) cancels the effect of each other.

Figure 6A:
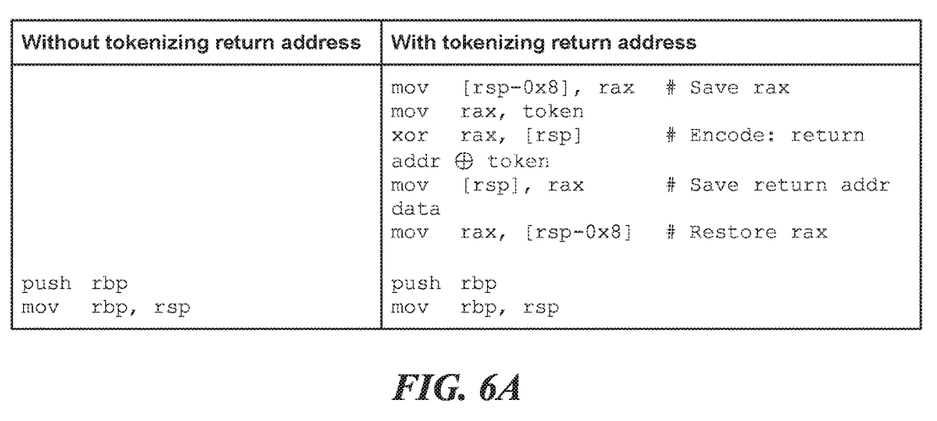
FIGS. 6A and 6B illustrate representative samples of function prologue and function epilogue using return address tokenization, according to some embodiments of the disclosed technology.
Figure 6B:
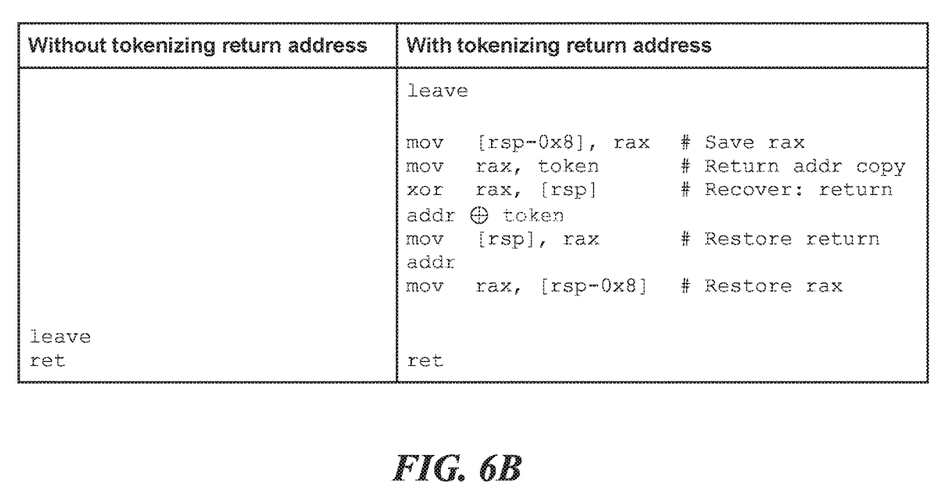

FIGS. 6A and 6B illustrate representative samples of function prologue and function epilogue using return address tokenization, according to some embodiments of the disclosed technology. For example, the representative samples can be applicable for transform time tokenization and load time tokenization. Specifically, FIG. 7A is code inserted at the function prologue and FIG. 7B is code inserted at the function code. In FIG. 6A, the right side of the table code indicates sample code that can be inserted at the prologue, when return address tokenization is employed. In FIG. 6B, the right side of the table code indicates sample code that can be inserted at the epilogue, when return address tokenization is employed. The left side in FIG. 6A and FIG. 6B indicate conventional code at the prologue and epilogue of a function.

Figure 7:
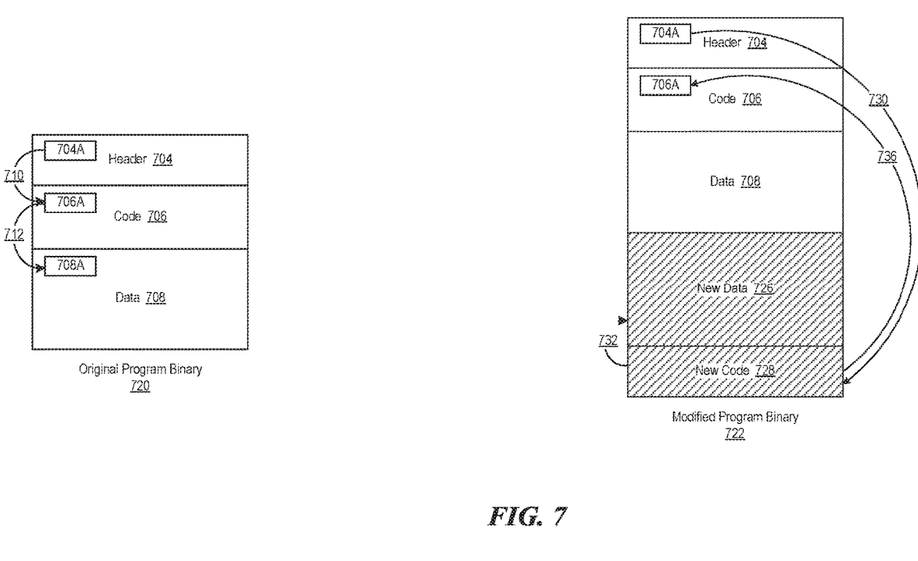
FIG. 7 shows a block diagram associated with generating a token when the program binary is loaded into the memory, according to some embodiments of the disclosed technology.

FIG. 7 shows a block diagram associated with generating a token when the program binary is loaded into the memory (a/k/a load time tokenization), according to some embodiments of the disclosed technology. FIG. 7 shows original program binary 720 including header 704, code 706, and data 708. FIG. 7 also shows an example of a program flow of original program binary. Starting from entry point 704A within header 304, program flow 710 jumps to code point 706A which references (e.g., via program flow 712) data section 708A in data 708. Thus, it can be understood and appreciated that program flow does not necessarily follow the manner in which the program binary is arranged (e.g., shown in FIG. 7 as non-overlapping sections for header 704, code 706, and data 708).

Tokenization of the return address when the program binary is loaded into memory causes modification of the original program binary. For example, original program binary 720 is changed into modified program binary 722 by adding new data section 726 and new code section 728. Modified program binary includes the same sections as original binary 722: header 304, code 306, data 308, in addition to newly inserted data section 726 and newly inserted code section 328. These sections were not present in original program binary 720 and are added for tokenizing the return address at load time. New code 728 references new data section 726 which stores the token(s) that are generated randomly (e.g., using a random number generator) at load time. New code section 728 references new data section 726 which stores the token(s) that are generated randomly (e.g., using a random number generator) at load time. In some embodiments, the token is a randomly generated token. In some embodiments, a token can be preset. Upon detecting a modification of the tokenized address, the code in the new code section 728 can cause the program to crash. In some embodiments, a token may be selected based on one or more properties of the processor architecture (e.g., ARM, PowerPC, etc.). One advantage of selecting architecture-specific tokens is that detecting modification of the token can be deliberately processed to point to an invalid memory address, causing the program to crash. New code section 728 hijacks or redirects program flow (denoted 730) from entry point 704A in header 704 of modified program binary 722. Subsequently, new code section 728 references (e.g., denoted as program flow 732) new data section 726 and reverts back to code point 706A in code section 706.

Figure 8:
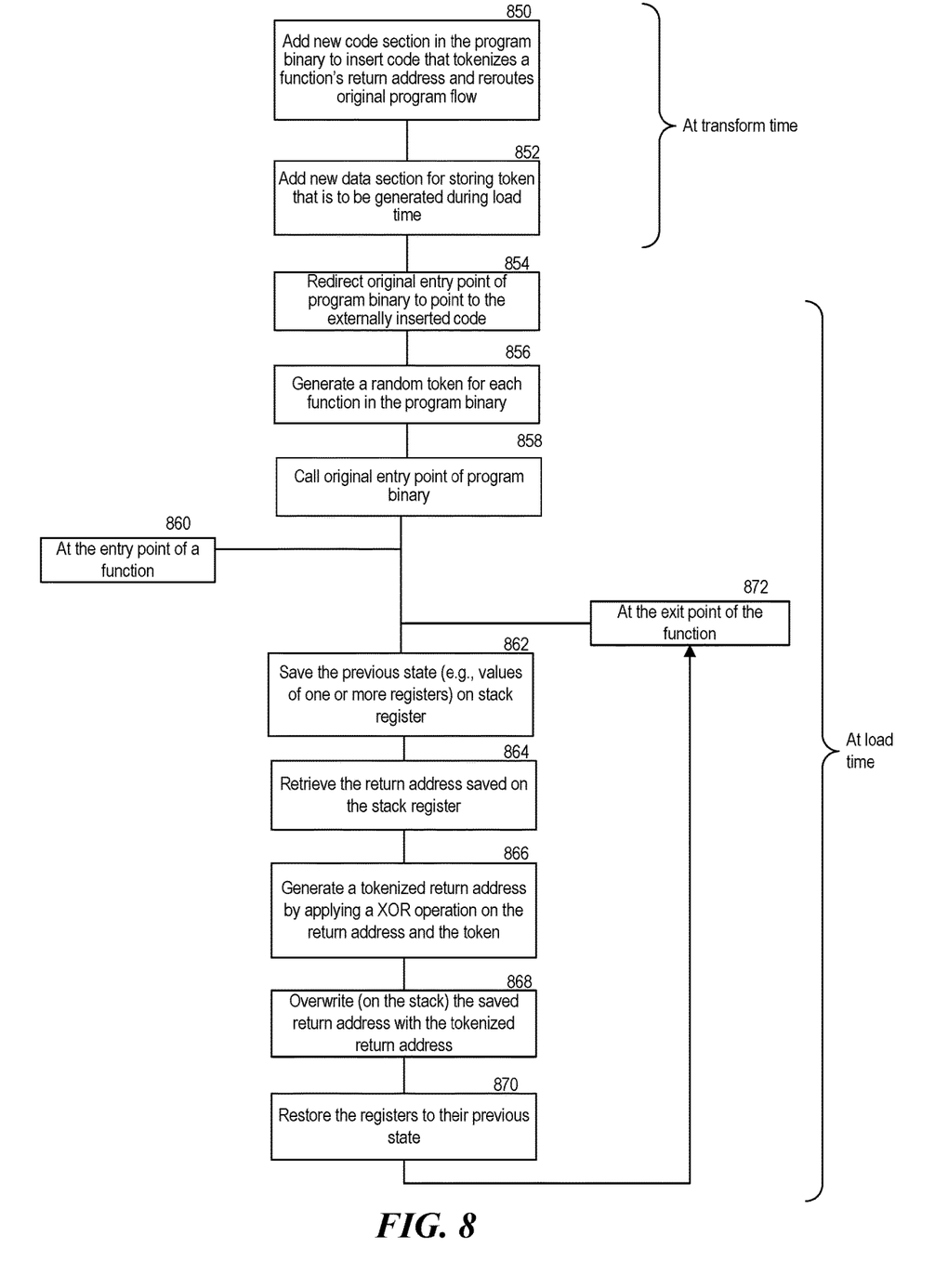
FIG. 8 shows a flowchart of steps of a process associated with generating a token at load time, according to some embodiments of the disclosed technology.

FIG. 8 shows a flowchart of steps of a process associated with generating a token at load time, according to some embodiments of the disclosed technology. According to these embodiments, given one instance of a transformed binary, every function of the instance is subjected to a different randomly-generated token. Further, given a function of the instance, the token does not change with multiple calls to this function. However, for a given function of the instance, multiple runs of the instance are likely to result in a different token for each run. Steps 850, 852, of the process can be performed at transform time and steps 854, 856, 858, 862, 864, 866, 868, 870 are performed by external code (e.g., new code section 728 in FIG. 7) at load time. At step 850, the process adds a new code section in the program binary to insert code that tokenizes a function's return address and reroutes the original program flow. At step 852, the process adds a new data section (e.g., new code section 728 in FIG. 7) in the program binary for storing a token that is to be generated during load time. At step 854, the process redirects the original entry point of the program binary to point to the new code section. The process generates (at step 856) random tokens for each function in the program binary. In some examples, the seed of the random number generator can be set by a user, if desired. The process calls (at step 858) the original entry point of the program binary. As a result, the process then follows the original flow of the program binary. Upon entry (prologue 860) into a function, the process saves (step 862) the previous states (e.g., values) of one or more registers on the stack. At step 864, the process retrieves the return address saved on the stack register. At step 866, the process generates a tokenized return address by applying a binary operation (e.g., XOR operation) on the return address and the token. At step 868, the process overwrites the return address saved on the stack register with the tokenized return address. The process restores (step 870) the registers to their previous state. Steps 862, 864, 866, 868, and 870 are performed at the entry point (prologue 860) and the exit point (epilogue 872) of the function. At the exit point (epilogue 872) of the function, steps 862, 864, 866, 868, and 870 are repeated. It will be understood that under normal program operation (no anomalous behavior), the result of applying two tokenizations (once at the prologue and subsequently at the epilogue) cancels the effect of each other.

Figure 9:
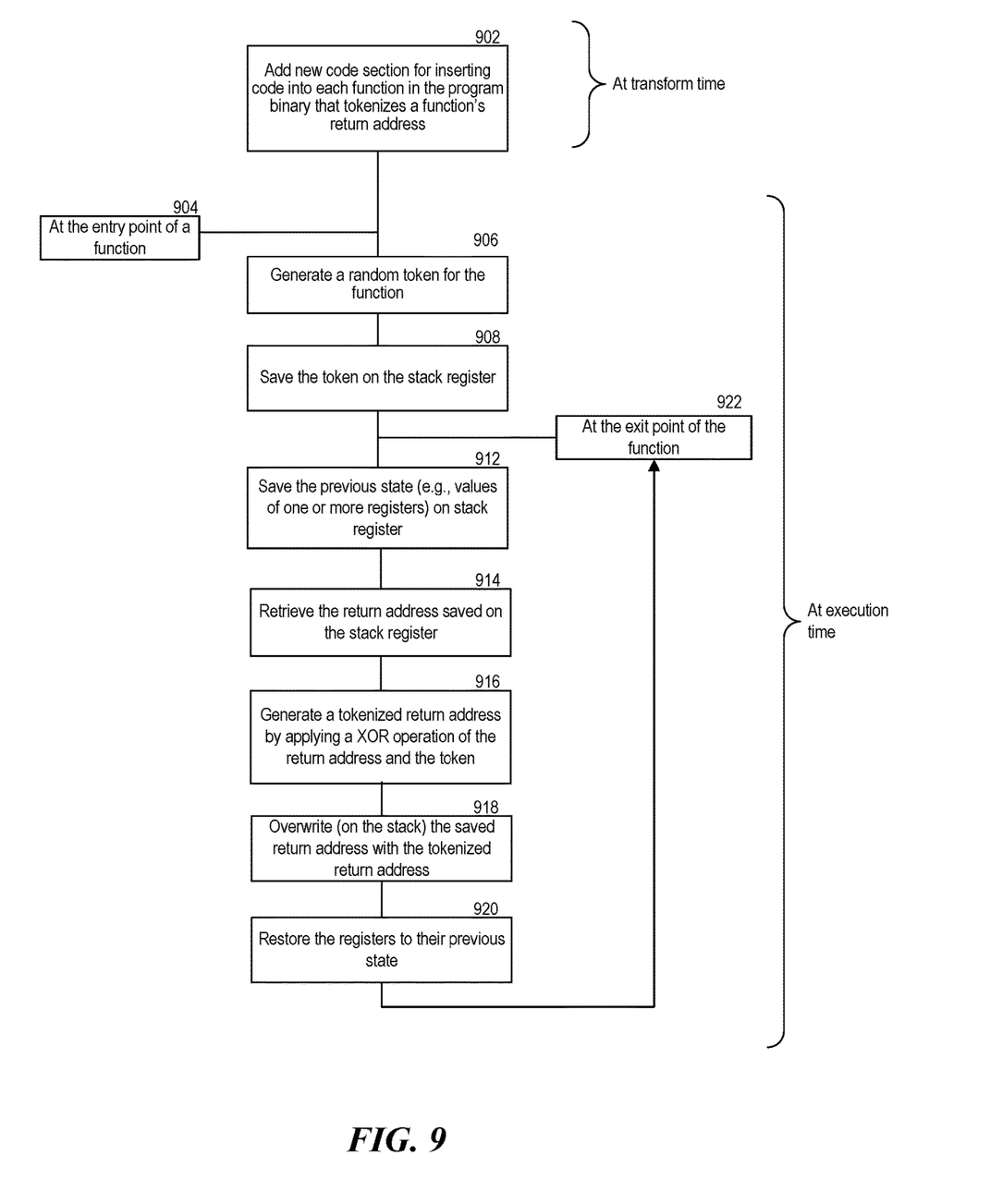
FIG. 9 shows a flowchart of steps of a process associated with generating a token at function entry during run time, according to some embodiments of the disclosed technology.

FIG. 9 shows a flowchart of steps of a process associated with generating a token at run time, according to some embodiments of the disclosed technology. Step 902 is performed at transform time. Steps 906, 908, 912, 914, 916, 918, and 920 are performed at execution time (or, run time). At step 902, the process adds new code section for inserting new code into each function in the program binary. The new code tokenizes a function's return address at the entry point of each function. In some examples, the seed of the random number can be set by a user, if desired. At the entry point (prologue 904) of a function, the process generates a random token for the function. At step 908, the token is saved on the stack register. The process saves (step 912) the previous states (e.g., values) of one or more registers on the stack. At step 914, the process retrieves the return address of the function that is saved on the stack register. At step 916, the process generates a tokenized return address by applying a binary operation (e.g., XOR operation) on the return address and the token. At step 918, the process overwrites the return address saved on the stack register with the tokenized return address. The process restores (step 920) the registers to their previous state. Steps 906, 908, 912, 914, 916, 918, and 920 are performed at the entry point (prologue 904) and the exit point (epilogue 922) of the function. At the exit point (epilogue 922) of the function, steps 906, 908, 912, 914, 916, 918, and 920 are repeated. It will be understood that under normal program operation (no anomalous behavior), the result of applying two tokenizations (once at the prologue and subsequently at the epilogue) cancels the effect of each other.

The systems and methods of the present disclosure include the ability to modify a program binary by injecting code into a function of a program binary that tokenizes the return address of the function. The tokenization of the return address improves the robustness of the program binary against cyberattacks and results in an improved CFI. For example, an attacker's attempt to hijack program flow before a function return will fail since any return address modified by the adversary will be tokenized (e.g., using a XOR operation) resulting in an unusable address that will cause the system to crash. One advantage of the improved CFI consumes less average overhead and does not involve the complications of the conventional CFI systems. The token can be generated at transform time, load time or run time, depending on the computing resources available, constraints (if any), and/or choices of system managers.

Some embodiments of the disclosed technology are presented below in clause-based format.

1. A method of modifying a program binary by injecting code into a function of a program binary for defending against cybersecurity attacks on a stack register included as part of a random access memory (RAM) configured for storing local variables of a function used by the program binary, the method comprising:
generating a random token;
creating a list of functions in the program binary;
adding a new data section in the program binary;
inserting the token in the new data section;
at entry of a function in the list of functions:
(a) saving previous states of one or more registers on the stack register;
(b) retrieving the token from the new data section;
(c) retrieving a return address of the function saved on the stack register;
(d) generating a tokenized return address by applying a binary operation on the return address and the token;
(e) overwriting the return address saved on the stack register with the tokenized return address;
(f) restoring the one or more registers to the previous states;
at exit of the function:
repeating steps (a) through (f).

2. The method of clause 1, wherein inserting the binary operation includes a XOR operation.

3. The method of clause 1, wherein creating the list of functions in the program binary includes identifying code resembling function-like characteristics.

4. The method of clause 3, wherein identifying code resembling function-like characteristics includes at least one of: detecting presence of debug symbols in the section of the program binary, detecting information in file headers associated with the program binary, applying heuristics of other sections of the program binary, or detecting sequences of bytes that indicate function prologues.

5. The method of clause 1, wherein the token is applicable to modify all functions included in an instantiation of the program binary.

6. The method of clause 1, wherein the stack register is an architecture-specific register.

7. The method of clause 1, wherein the architecture-specific register includes at least one of rbp or rsp.

8. A non-transitory computer-readable storage medium having stored thereon instructions for modifying a program binary by injecting code into a function of a program binary for defending against cybersecurity attacks on a stack register included as part of a random access memory (RAM) configured for storing local variables of a function used by the program binary, wherein the instructions when executed by a processor of an electronic device cause the processor to:
generate a random token;
create a list of functions in the program binary;
add a new data section in the program binary;
insert the token in the new data section;
at entry of a function in the list of functions:
(a) save previous states of one or more registers on the stack register;
(b) retrieve the token from the new data section;
(c) retrieve a return address of the function saved on the stack register;
(d) generate a tokenized return address by applying a binary operation on the return address and the token;
(e) overwrite the return address saved on the stack register with the tokenized return address;
(f) restore the one or more registers to the previous states;
at exit of the function:
repeat steps (a) through (f).

9. The non-transitory computer-readable storage medium of clause 8, wherein the instruction to insert the binary operation includes instructions for a XOR operation.

10. The non-transitory computer-readable storage medium of clause 8, wherein the instruction to create the list of functions in the program binary includes instructions for identifying code resembling function-like characteristics.

11. The non-transitory computer-readable storage medium of clause 10, wherein the instruction to identify code resembling function-like characteristics includes instructions for at least one of: detecting presence of debug symbols in the section of the program binary, detecting information in file headers associated with the program binary, applying heuristics of other sections of the program binary, or detecting sequences of bytes that indicate function prologues.

12. The non-transitory computer-readable storage medium of clause 8, wherein the token is applicable to modify all functions included in an instantiation of the program binary.

13. The non-transitory computer-readable storage medium of clause 8, wherein the stack register is an architecture-specific register.

14. The non-transitory computer-readable storage medium of clause 13, wherein the architecture-specific register includes at least one of rbp or r sp.

15. An apparatus for hijacking program flow in a program binary for modifying a program binary by injecting code into a function of a program binary for defending against cybersecurity attacks comprising:
at least one random access memory (RAM) storing a stack register configured for storing local variables of the function included in the program binary; and
at least one processor coupled to the at least one RAM, the at least one processor configured for:
generating a random token;
creating a list of functions in the program binary;
adding a new data section in the program binary;
inserting the token in the new data section;
at entry of a function in the list of functions:
(a) saving previous states of one or more registers on the stack register;
(b) retrieving the token from the new data section;
(c) retrieving a return address of the function saved on the stack register;
(d) generating a tokenized return address by applying a binary operation on the return address and the token;
(e) overwriting the return address saved on the stack register with the tokenized return address;
(f) restoring the one or more registers to the previous states;

at exit of the function:
  repeating steps (a) through (f).

16. The apparatus of clause 15, wherein the binary operation includes instructions for a XOR operation.

17. The apparatus of clause 15, wherein creating the list of functions in the program binary includes identifying code resembling function-like characteristics.

18. The apparatus of clause 15, wherein identifying code resembling function-like characteristics includes at least one of: detecting presence of debug symbols in the section of the program binary, detecting information in file headers associated with the program binary, applying heuristics of other sections of the program binary, or detecting sequences of bytes that indicate function prologues.

19. The apparatus of clause 15, wherein the token is applicable to modify all functions included in an instantiation of the program binary.

20. The apparatus of clause 15, wherein the stack register is an architecture-specific register.

The embodiments or portions thereof of the system and method of the present invention may be implemented in computer hardware, firmware, and/or computer programs executing on programmable computers or servers that each includes a processor and a storage medium readable by the processor (including volatile and non-volatile memory and/or storage elements). Any computer program may be implemented in a high-level procedural or object-oriented programming language to communicate within and outside of computer-based systems.

Any computer program may be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform the functions of the embodiments. The embodiments, or portions thereof, may also be implemented as a machine-readable storage medium, configured with a computer program, where, upon execution, instructions in the computer program cause a machine to operate to perform the functions of the embodiments described above.

The embodiments, or portions thereof, of the system and method of the present invention described above may be used in a variety of applications. Although the embodiments, or portions thereof, are not limited in this respect, the embodiments, or portions thereof, may be implemented with memory devices in microcontrollers, general purpose microprocessors, digital signal processors (DSPs), reduced instruction-set computing (RISC), and complex instruction set computing (CISC), among other electronic components. Moreover, the embodiments, or portions thereof, described above may also be implemented using integrated circuit blocks referred to as main memory, cache memory, or other types of memory that store electronic instructions to be executed by a microprocessor or store data that may be used in arithmetic operations.

The descriptions are applicable in any computing or processing environment. The embodiments, or portions thereof, may be implemented in hardware, software, or a combination of the two. For example, the embodiments, or portions thereof, may be implemented using circuitry, such as one or more of programmable logic (e.g., an ASIC), logic gates, a processor, and a memory.

Various modifications to the disclosed embodiments will be apparent to those skilled in the art, and the general principals set forth below may be applied to other embodiments and applications. Thus, the present disclosure is not intended to be limited to the embodiments shown or described herein.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

I claim:

1. A method of modifying a program binary by injecting code into a function of a program binary for defending against cybersecurity attacks on a stack register included as part of a random access memory (RAM) configured for storing local variables of a function used by the program binary, the method comprising:
  generating a random token;
  creating a list of functions in the program binary;
  adding a new data section in the program binary;
  inserting the token in the new data section;
  at entry of a function in the list of functions:
    (a) saving previous states of one or more registers on the stack register;
    (b) retrieving the token from the new data section;
    (c) retrieving a return address of the function saved on the stack register;
    (d) generating a tokenized return address by applying a binary operation on the return address and the token;
    (e) overwriting the return address saved on the stack register with the tokenized return address;
    (f) restoring the one or more registers to the previous states;
  at exit of the function:
    repeating steps (a) through (f).

2. The method of claim 1, wherein the binary operation includes a XOR operation.

3. The method of claim 1, wherein creating the list of functions in the program binary includes identifying code resembling function-like characteristics.

4. The method of claim 3, wherein the identifying code resembling function-like characteristics includes at least one of: detecting presence of debug symbols in the program binary, detecting information in file headers associated with the program binary, applying heuristics of other sections of the program binary, or detecting sequences of bytes that indicate function prologues.

5. The method of claim 1, wherein the token is applicable to modify all functions included in an instantiation of the program binary.

6. The method of claim 1, wherein the stack register is an architecture-specific register.

7. The method of claim 6, wherein the architecture-specific register includes at least one of rbp or rsp.

8. A non-transitory computer-readable storage medium having stored thereon instructions for modifying a program binary by injecting code into a function of a program binary for defending against cybersecurity attacks on a stack register included as part of a random access memory (RAM) configured for storing local variables of a function used by the program binary, wherein the instructions when executed by a processor of an electronic device cause the processor to:
generate a random token;
create a list of functions in the program binary;
add a new data section in the program binary;
insert the token in the new data section;
at entry of a function in the list of functions:
(a) save previous states of one or more registers on the stack register;
(b) retrieve the token from the new data section;
(c) retrieve a return address of the function saved on the stack register;
(d) generate a tokenized return address by applying a binary operation on the return address and the token;
(e) overwrite the return address saved on the stack register with the tokenized return address;
(f) restore the one or more registers to the previous states;
at exit of the function:
repeat steps (a) through (f).

9. The non-transitory computer-readable storage medium of claim 8, wherein the instruction to apply the binary operation includes instructions for a XOR operation.

10. The non-transitory computer-readable storage medium of claim 8, wherein the instruction to create the list of functions in the program binary includes instructions for identifying code resembling function-like characteristics.

11. The non-transitory computer-readable storage medium of claim 10, wherein the instruction to identify code resembling function-like characteristics includes instructions for at least one of: detecting presence of debug symbols in the program binary, detecting information in file headers associated with the program binary, applying heuristics of other sections of the program binary, or detecting sequences of bytes that indicate function prologues.

12. The non-transitory computer-readable storage medium of claim 8, wherein the token is applicable to modify all functions included in an instantiation of the program binary.

13. The non-transitory computer-readable storage medium of claim 8, wherein the stack register is an architecture-specific register.

14. The non-transitory computer-readable storage medium of claim 13, wherein the architecture-specific register includes at least one of rbp or rsp.

15. An apparatus for hijacking program flow in a program binary for modifying a program binary by injecting code into a function of a program binary for defending against cybersecurity attacks comprising:
at least one random access memory (RAM) storing a stack register configured for storing local variables of the function included in the program binary; and
at least one processor coupled to the at least one RAM, the at least one processor configured for:
generating a random token;
creating a list of functions in the program binary;
adding a new data section in the program binary;
inserting the token in the new data section;
at entry of a function in the list of functions:
(a) saving previous states of one or more registers on the stack register;
(b) retrieving the token from the new data section;
(c) retrieving a return address of the function saved on the stack register;
(d) generating a tokenized return address by applying a binary operation on the return address and the token;
(e) overwriting the return address saved on the stack register with the tokenized return address;
(f) restoring the one or more registers to the previous states;
at exit of the function:
repeating steps (a) through (f).

16. The apparatus of claim 15, wherein the binary operation includes instructions for a XOR operation.

17. The apparatus of claim 15, wherein creating the list of functions in the program binary includes identifying code resembling function-like characteristics.

18. The apparatus of claim 15, wherein the identifying code resembling function-like characteristics includes at least one of: detecting presence of debug symbols in the program binary, detecting information in file headers associated with the program binary, applying heuristics of other sections of the program binary, or detecting sequences of bytes that indicate function prologues.

19. The apparatus of claim 15, wherein the token is applicable to modify all functions included in an instantiation of the program binary.

20. The apparatus of claim 15, wherein the stack register is an architecture-specific register.

* * * * *